United States Patent
Lowe et al.

(10) Patent No.: US 6,278,495 B1
(45) Date of Patent: Aug. 21, 2001

(54) DIGITAL COMB FILTER FOR DECODING COMPOSITE VIDEO SIGNALS

(75) Inventors: Virgil L. Lowe, Roswell; John W. Curtis, Lakemont, both of GA (US)

(73) Assignee: Fortel DTV, Inc, Atlanta, GA (US)

( * ) Notice: Subject to any disclaimer, the term of this patent is extended or adjusted under 35 U.S.C. 154(b) by 0 days.

(21) Appl. No.: 09/523,888

(22) Filed: Mar. 13, 2000

Related U.S. Application Data

(60) Provisional application No. 60/124,227, filed on Mar. 12, 1999.

(51) Int. Cl.[7] ..................................................... H04N 9/78
(52) U.S. Cl. ............................................. 348/665; 348/669
(58) Field of Search ..................................... 348/663, 664, 348/665, 667, 669, 670; H04N 9/77, 9/78

(56) References Cited

U.S. PATENT DOCUMENTS

| | | | |
|---|---|---|---|
| 3,542,945 | 11/1970 | Parker | 178/5.4 |
| 3,860,952 | 1/1975 | Tallent et al. | 358/8 |
| 4,240,105 | 12/1980 | Faraoudja | 358/31 |
| 5,398,079 | 3/1995 | Liu et al. | 348/699 |
| 5,424,784 | 6/1995 | Raby | 348/668 |
| 5,526,060 | 6/1996 | Raby | 348/663 |
| 5,663,771 | 9/1997 | Raby | 348/663 |
| 5,742,784 | 4/1998 | Potter et al. | 395/389 |
| 5,805,238 | 9/1998 | Raby et al. | 348/609 |
| B1 3,860,952 | 1/1995 | Tallent et al. | 348/498 |

*Primary Examiner*—Sherrie Hsia
(74) *Attorney, Agent, or Firm*—Womble Carlyle Sandridge & Rice, PLLC

(57) ABSTRACT

A digital comb filter for decoding composite video signals into a luminance and a chrominance component. A Fast Fourier Transform (FFT) circuit or a band split filter circuit is used to determine important characteristics of an input video signal without demodulating the video signal. The circuits produce a signature signal by which each of the video lines can be correlated. Signature signals on various surrounding video lines that are of opposite subcarrier phase with the current line are compared to determine similarity and appropriate weighting coefficients for the surrounding lines. If none of the surrounding lines are similar, the comb reverts to a band split filter to form chrominance. A noise measure circuit determines an error signal input used to adjust the weighting coefficients as the noise level increases or decreases. Multiplexer combines high pass and low pass taps of a band split filter into a single data stream. Line delays delay the current video signal to form two additional lines of video. Field delay memories provide field delay and frame delay taps to the comb filter. Line delay, together with field delay memories, provide the interlaced line above and below the current line for the comb filter. Interframe motion detector gives priority to the frame comb signal when no motion is detected between the current line and the frame delayed signal in the same vertical position as the current line.

53 Claims, 9 Drawing Sheets

DIGITAL COMB FILTER FOR DECODING COMPOSITE VIDEO SIGNALS

CROSS-REFERENCE TO RELATED APPLICATIONS

This application claims the benefit of U.S. Provisional Application No. 60/124,227 filed Mar. 12, 1999. This application is related to co-pending and commonly assigned patent applications "Time Base Corrector", Ser. No. 09/523,884 and "Composite Video Decoder", Ser. No. 09/523,889 filed concurrently herewith. Each co-pending patent application is hereby incorporated by reference into this description as fully as if here represented in full.

BACKGROUND OF THE INVENTION

The present invention relates generally to an apparatus for decoding of composite video to provide high quality serial digital output and, more particularly, to a combination of unique circuits including a three-dimensional comb filter for providing better separation of composite video into luminance and chrominance components.

Composite video signals have been the standard for most video recording, production and transmission. The composite signal may conform to the National Television System Committee (NTSC) standard in the U.S., most of the Americas, Japan and many other countries, or the Phase Alternating Line (PAL) standard in most of Europe, Africa, and Asia. The composite signal consists of the luminance (Y) signal and the chrominance (C) signal which is encoded on a subcarrier and added to the luminance signal. There is a problem with separating the composite signal back into the Y and C signals because of the process of encoding chroma on the luminance signal. The luminance signal has a frequency response of near direct current (DC) to greater than 4.2 MHz in NTSC and 5.5 MHz in PAL. The chrominance is modulated on a subcarrier of 3.579545 MHz in NTSC and 4.433619 MHz in PAL using a quadrature modulation technique. The two signals are then simply added together. This places the chrominance signal in the high frequency range of the luminance pass band. Simple band split filters leave some of the chrominance signal in the luminance and some of the luminance signal in the chrominance.

Video decoders have been used for several years that use various forms of comb filters to separate the luminance and chrominance signals. Comb filters have been used to achieve full bandwidth or near full bandwidth luminance separation for video recorders, time base correctors (TBCs), video synchronizers, video monitors, Moving Picture Experts Group (MPEG) and Joint Photograhics Experts Group (JPEG) compressors and other video devices.

A comb filter is a well known technique that adds or subtracts two or more lines of video to separate the Y and C signals. Comb filters work because the subcarrier phase of every other line is inverted in NTSC signals and every second line is inverted in PAL. The V (R-Y) vector is inverted every other line in PAL resulting in an apparent 90 degree phase shift of the subcarrier per line. In the NTSC system, a simple two line comb adds two lines of video to cancel the chrominance and leave only luminance, and subtracts the two lines to cancel the luminance to extract chrominance. In the PAL system, a simple one line delay comb will separate the V vector from the composite signal requiring another step or technique to separate the U (B-Y) vector. A so-called PAL modifier is commonly used for this purpose. A two line delay is required to make a comb filter work the same in PAL as it does for NTSC. The problem with simple 2 line comb filters is they cause a vertical smear of the chrominance signal and high frequency luminance signals at vertical transitions in the video signal (e.g., U.S. Pat. No. 3,542,945 to Parker). Three line comb filters average the line above and below the current line before adding or subtracting from the current line. This helps center the smear and reduce its effects. Adaptive comb filters were invented to further minimize the smearing problem (e.g., U.S. Pat. No. 4,240,105 to Faroudja).

An adaptive comb filter switches or fades to a band split technique of separating high frequency chrominance from lower frequency luminance signals when a difference is detected between the current line and the lines that are being used to comb filter. When a difference exists between lines it means that the comb will not extract luminance and chrominance properly and will cause chroma smears, hue shifts, and/or luminance smears (loss of high frequency resolution) at these points. This effect is commonly known as a comb failure.

There are many problems in detecting a change in chrominance between lines of video. The chroma signal is inverted from line to line but the luminance edges of vertical lines are not inverted. Therefore, comparing the high frequency video between two lines at the corners of objects results in a difference signal at the horizontal edge of an object even when the color brightness, hue and saturation are the same. The technique disclosed by Faroudja filters off the high frequency chrominance signal, which also filters off the high frequency luminance, and uses the differences between lines of the remaining low frequency luminance signal to detect a comb fail. The comb fail signal is used to switch from a comb filter to a band split filter for Y/C separation. Another older technique compares the line above and below the current video line to determine comb fail of a 3 line comb filter. This system works well on multiple line vertical edges because the line to line chroma inversion is back in phase every second line. The problem with this technique is it will fail at a vertical transition for two lines causing a rounding of the comers of objects when it switches to band split separation mode at the comb failure point.

Field and frame comb filters cause motion artifacts when they fail. All adaptive techniques have the same problem when they switch to band split mode because the high frequency component contains both luminance and chrominance. This causes a loss of horizontal resolution and luma/chroma crosstalk.

Advances in comb filter design are generally made in the comb fail detection circuits. In general these improvements are an attempt to reduce the luma and chroma smear by combing when combing is appropriate and switching to band split separation when combing would produce a comb smear artifact. There is always a trade off in artifacts due to the fact that objects on the video screen are seldom perfect transitions from one easily distinguishable object to another as a cartoon would be.

In the present state of the art, the most advanced comb filter designs are described in the patents to Raby (U.S. Pat. Nos. 5,424,784 and 5,526,060). The comb filter design disclosed uses demodulated chroma rather than the low frequency luminance data or high frequency composite chroma data to determine comb fail characteristics of the video. The U and V signals can be used as is, converted to RGB (red, green and blue) or HSI (hue, saturation and intensity) to determine comb fail. The HSI signals of three lines are compared and the differences are used as inputs to a lookup table to determine the comb fail threshold. The lookup table is used to determine the ratio of the hue, saturation and intensity differences between lines to determine the comb fail threshold.

SUMMARY OF THE INVENTION

The main differences between this invention and prior art comb filters, including those disclosed by the Raby patents, are the concept and type of circuit used to determine the comb fail characteristics, the number of simultaneous taps used, the way this invention is able to continuously vary the weighting factor between filter taps instead of making a full transition away from one tap to another and the use of a noise level measurement to adapt the comb fail characteristics with noise level. The Raby invention separates the high frequency signals from three lines simultaneously, demodulates each of them separately, transforms the demodulated signals to HSI and compares the HSI signals for differences between lines to form a comb fail signal. The present invention does not use any of these operations.

This invention uses a Fast Fourier Transform (FFT) circuit, or a simple band split filter circuit, to determine important characteristics of each line of video without demodulating the signal. These circuits produce a signature signal by which each of the lines can be correlated. The signature signals on various surrounding video lines, that are of opposite subcarrier phase with the current line, are compared to the current line to determine the similarity. The result is used to determine the weighting coefficients of the surrounding lines. There is a cross-coupling of the raw similarity or difference data from the four surrounding lines so that one of the lines can be weighted with a zero coefficient if it is slightly dissimilar but an opposite line is very similar. However, if all four lines are slightly dissimilar they may all be used in an equal proportion of 25% each. If one of the four lines is similar, one is slightly dissimilar and two are very dissimilar, the ratio may be 75% for the similar line, 25% for the slightly dissimilar line, and 0% for the two very dissimilar lines. The logic is biased to achieve a sum of 100% while minimizing the creation of excessive comb artifacts such as a visible smear.

When none of the surrounding lines are similar enough for the comb filter to work properly the comb reverts to a band split mode in a unique way. When all 4 lines are very dissimilar, the current line is passed through a band pass filter to form chrominance. This signal may then be subtracted from the full bandwidth current line to give the equivalent of a filtered luma output with a notch around the subcarrier frequency. There are multiple intermediate sets of steps between 100% comb and 100% band split mode. If one or more of the surrounding lines is not similar enough to be used for 100% combing, a sum of a balancing percentage of the inversion of the current line is used to total to 100%. For example if 25% of one of the surrounding lines is used and 0% of the remaining 3 lines are useful, then 75% of the inversion of the current line will be added to make 100%. The ratio could be in any percentage, however, the steps are limited to 12.5% increments in the present embodiment to reduce cost and fit within the device selected to implement the design. A different implementation may increase the resolution by adding more steps.

Furthermore, with shaded objects the chroma saturation or intensity may increase or decrease over a few video lines. Both the line above and below the current line may be dissimilar but the average of the line above and below may be similar to the current line. The circuit detects this situation and weights the lines above and below equally to create the effect of a similar line after the two lines are summed.

It is also known that noise will modulate the chroma and luma signals and cause a dissimilar indication when the only difference is noise. The noise would therefore cause the comb filter to fail when the combing action of averaging lines would reduce the noise as well as separate the luma and chroma. For this reason the circuit for determining the error signal input to the weighting coefficients uses a noise level code to select higher sets of error values as the noise increases. The net result is that as noise increases more error is required to determine that a line is less similar. As the noise reaches a value where the noise is more objectionable than the smear produced by combing dissimilar lines, the coefficients to all four lines is turned on to 25% each. Furthermore, the adjacent line in the delayed field, that matches the phase of the current line, can also be averaged with the current line to further improve noise reduction in very high noise situations.

BRIEF DESCRIPTION OF THE DRAWINGS

The invention is better understood by reading the following detailed description of the preferred embodiment in conjunction with the accompanying drawings wherein.

DETAILED DESCRIPTION OF THE PREFERRED EMBODIMENT

Figure 1:
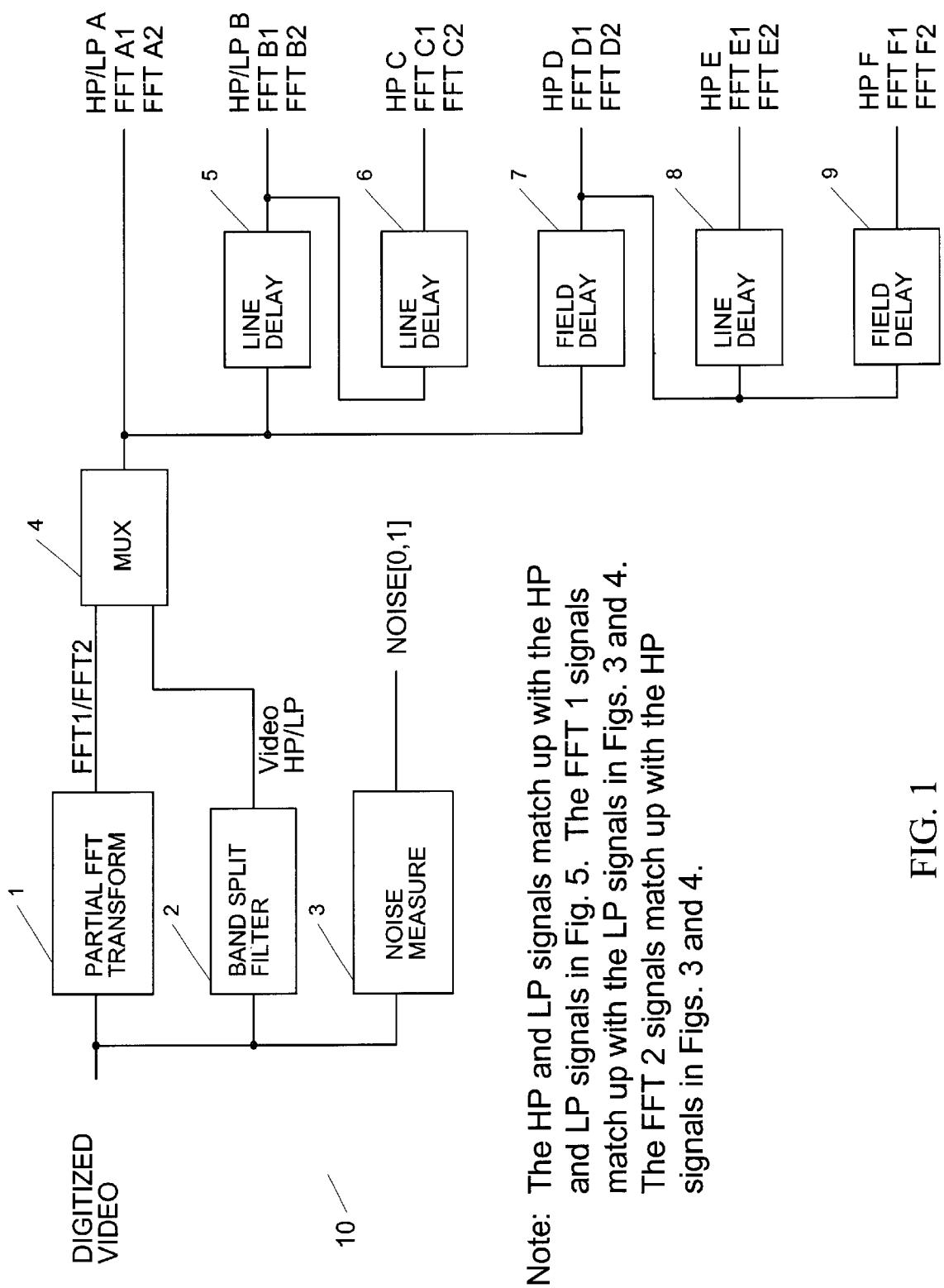
FIG. 1 illustrates the development of Fast Fourier Transform (FFT) transforms that can be used to define the characteristics of video lines for making line similarity comparisons.

In this system, elements derived either from a series of bandsplit filters, or from the Fast Fourier Transform (FFT) are used to measure the degree of similarity between adjacent lines. While the FFT mathematically resembles a series of bandsplit filters, it is actually a measure of both frequency and phase of the video signals. This distinction is important because color variations in modulated chroma show up as phase changes. Although the FFT is the superior method for determining similarity, in the preferred embodiment of the present invention, a simpler bandsplit method has been used due to a lack of available hardware resources.

Although there are a number of ways in which the FFT can be implemented, the preferred implementation is to use only the real part of the FFT calculation. This is due to the fact that the measurement required to control the adaptation of the comb filter is not strictly a phase and magnitude measurement, but rather a measurement of similarity. In practice, if the real part of the FFT remains correlated between two adjacent lines of video through a number of pixels, then it is highly likely that the signals are similar. One could be more certain of the result if the imaginary portion of the FFT was also used, but this would double the size of the calculation required and would add only a small increment of accuracy to the measurement.

For the best hardware efficiency, the FFT is calculated immediately after the signal is converted into digital form. Since memory has become inexpensive, it turns out to be more cost effective to calculate the FFT taps once and then carry the measurements through the memory with the video data than it would be to calculate the information for each adjacent line as the comparisons are being made.

In the preferred embodiment, a simpler bandsplit method is used so that hardware efficiency can be gained by using the same filtered signals for similarity detection as are used to derive the ultimate luma and chroma signals in the event of a complete comb failure.

As with other elements of the decoder, the level of noise present in the system changes the algorithm required to obtain the best picture quality output from the system. When there is minimal noise present in the system, great care must be taken to avoid combing dissimilar lines of video so that there is no smearing. However, when there are high levels of noise, the artifacts of bad combing are less visible while the noise itself can be canceled to a degree by the averaging inherent in the combing process. In this case, adaptation of the comb must be much less sensitive to achieve optimal results.

Unlike prior art comb filters, the invention uses the sum of the four surrounding lines that are out of phase with the current line for comb filtering. A weighting factor is applied to each input depending on the similarity to the current the state machine is then allowed to approach the target error one step at a time, thus eliminating the possibility of a sudden change.

In spite of this damping, it is possible for short spikes of error to pass through the measurement system, especially during sharp simultaneous transitions in both luma and chroma. To eliminate these spikes, the system makes use of the bandlimited characteristic of video. Because of this characteristic, pulses narrower than a certain width cannot be measurements of real video. These narrow pulses can be discarded as artifacts of the measurement process. An erosion circuit is provided for that purpose.

The unity gain control processes the error signals that are the outputs of the damping state machine through an array of ROM tables which have been precalculated.

Figure 6:
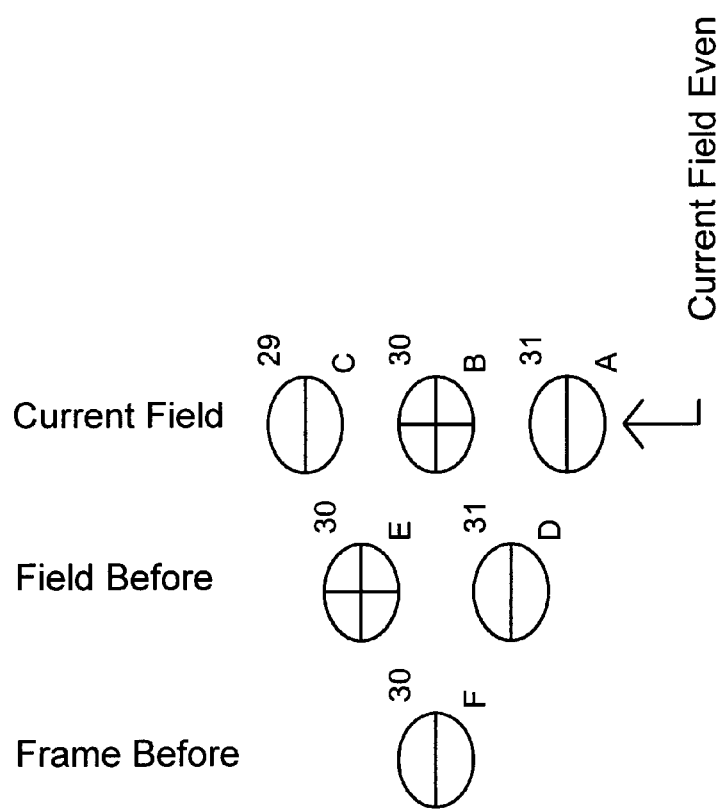
FIG. 6 illustrates the use of four surrounding lines that are out of phase with the current line in the comb filtering of the present invention.
Figure 6:
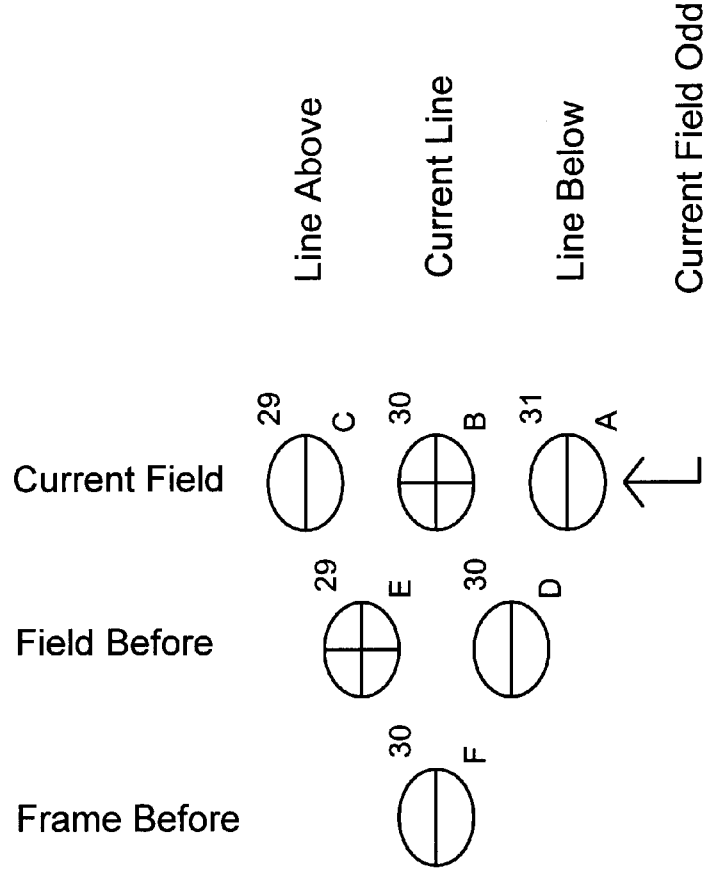

In order to understand the comb filter diagram and operation it is useful to understand the subcarrier phase relationship of the surrounding video lines. Using the NTSC standard as an example, note that the subcarrier that is used to modulate the chroma signals contains an odd multiple of half cycles per line. This causes an inversion of the subcarrier every other line. There are 525 lines per frame which is an odd number therefore there is also an inversion on alternate frames. FIG. 6 is a two dimensional representation of three lines of video in a present field, two interlaced lines of video from the previous field and one line of video from the previous frame of video in the NTSC system. Note that ⊕ represents lines that are in phase with the current line subcarrier and ⊖ represents lines that are out of phase with the current line subcarrier. A represents the advanced line, B represents the current line and C represents the delayed line of video in the current field. D represents the out-of-phase line in the delayed field and E represents the in-phase line in the delayed field. F is the frame line. Surrounding lines are defined as the line above, the line below, the line one frame delayed and the line below the current line that is delayed by one field. This concept is illustrated in FIG. 6. The four surrounding lines that are used for this part of the comb filter are of inverted chroma phase compared to the current line. The sum of the various lines should be unity gain, meaning the sum could be ¼A, ¼C, ¼D and ¼F or any combination that adds to 1.

As a comb filter adapts to the relative similarity of the adjacent lines of video, it is important that the adaptation not be sudden, since that can inject artifacts into the video, and the gain must remain at unity. In the preferred implementation, both of these functions are implemented in read only memory (ROM) tables because the implementation fits the device used, however, discrete logic could be used to achieve the same results.

The damping of the adaptation is implemented as a state machine constructed around a ROM memory. As the two relevant taps of the similar measurement are compared for each pair of adjacent lines, the target error is calculated. The output of the state machine is then allowed to approach the target error one step at a time, thus eliminating the possibility of a sudden change.

In spite of this damping, it is possible for short spikes of error to pass through the measurement system, especially during sharp simultaneous transitions in both luma and chroma. To eliminate these spikes, the system makes use of the bandlimited characteristic of video. Because of this characteristic, pulses narrower than a certain width cannot be measurements of real video. These narrow pulses can be discarded as artifacts of the measurement process. An erosion circuit is provided for that purpose.

The unity gain control processes the error signals that are the outputs of the damping state machine through an array of ROM tables which have been precalculated.

In order to understand the comb filter diagram and operation it is useful to understand the subcarrier phase relationship of the surrounding video lines. Using the NTSC standard as an example, note that the subcarrier that is used to modulate the chroma signals contains an odd multiple of half cycles per line. This causes an inversion of the subcarrier every other line. There are 525 lines per frame which is an odd number therefore there is also an inversion on alternate frames. FIG. 6 is a two dimensional representation of three lines of video in a present field, two interlaced lines of video from the previous field and one line of video from the previous frame of video in the NTSC system. Note that ⊕ represents lines that are in phase with the current line subcarrier and ⊖ represents lines that are out of phase with the current line subcarrier. A represents the advanced line, B represents the current line and C represents the delayed line of video in the current field. D represents the out-of-phase line in the delayed field and E represents the in-phase line in the delayed field. F is the frame delayed signal in the same vertical position as the current line. Note that the frame delay is always out-of-phase with the current line.

The comb filter is illustrated in FIG. 2, FIG. 3, FIG. 4 and FIG. 5. An alternate embodiment for line characterization is show in FIG. 1. If used instead, FIG. 1 would replace FIG. 2. FIG. 1 also shows the line and field delays required to develop all of the required taps for the comb filter.

Figure 2:
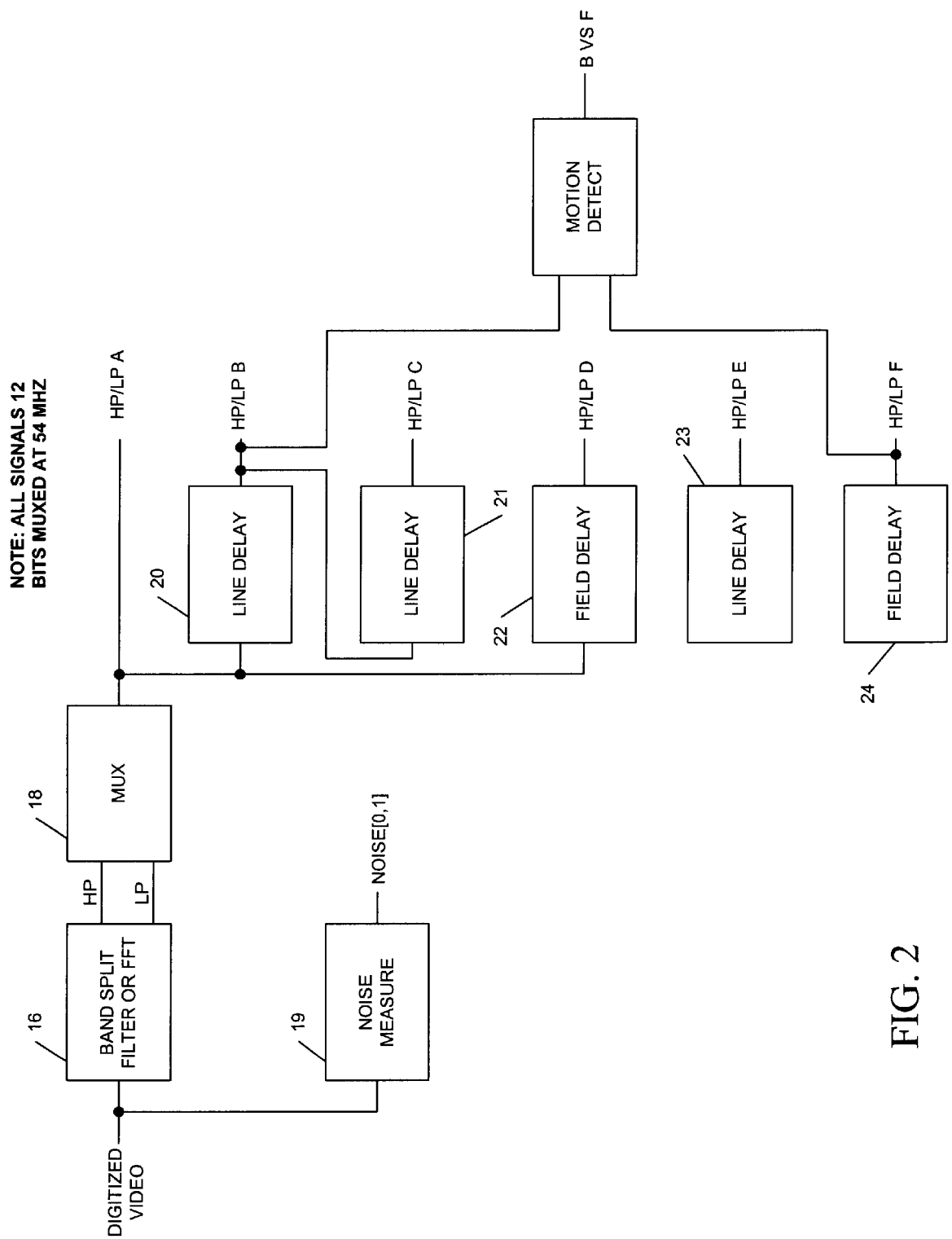
FIG. 2 illustrates the analysis of the incoming video signal by band split filtering, or alternately by use of the FFT transform.

FIG. 2 illustrates the development of the bandsplit filter bank or FFT transforms 16 that are used to define the characteristics of every part of every video line, and the delay devices that are used to produce the multiple line and field taps used by the comb filter. This processing is used to characterize every part of every video line. Delay devices are used to produce the multiple line and field taps used by the comb filter. An interframe motion detector 17 is also shown.

In FIG. 2, block 16 represents the bandsplit filter bank or the partial Fast Fourier Transform (FFT). Because the FFT would be used to correlate similar lines of video, and not to reconstruct the original signal, all of the taps of the FFT are not required. A fifteen point transform turns out to be a good compromise between having too few taps and covering too high a percentage of the line of video. A fifteen point FFT is calculated from the formula:

$$X_k = \sum_{n=0}^{15-1} x_n \cdot \left(e^{-ij\frac{2\pi}{15}}\right)^{nk}$$

In this formula $X_k$ is the value of the $k^{th}$ point of the FFT and $x_n$ is the $n^{th}$ point of a group of 15 samples on which the transform is being calculated. Later in the system, the FFT values from various lines will be compared. The presumption is that pixels that have similar FFT values can be combed.

The calculation is limited to only two points of the FFT—one near the subcarrier frequency and the other between the subcarrier and direct current (DC). Further, only the real portion of the FFT value is calculated. A test for similarity is made later, and for two complex values to match, both the real and imaginary portions must match. If the real portions do not match, then the complex numbers cannot match. If the real portions do match, while it is possible that the imaginary portions could be different, it is unlikely that this condition could persist over a significant number of clock cycles. Since the comb filter is not allowed to change states quickly, single point failures of the comparison can be tolerated and a significant savings in implementation hardware can be realized.

The preferred embodiment uses a two point band split filter bank which divides the incoming video in such a way that the low pass path (marked LP in the figures) has an upper cutoff frequency that is far enough below the subcarrier frequency and its sidebands that there is no chroma in the LP path. The high pass path (marked HP in the figures) contains both chroma and high frequency luma. This separation is used so that only the HP path needs to be combed.

Block 19 represents a noise measurement circuit which is more fully described in co-pending patent application, Ser. No. 09/523,889, which is incorporated by reference herein. This measurement is used to allow the comb filter to adapt to noisy conditions of the input signal.

Block 18 represents a multiplexer (mux) which is used to combine the high pass and low pass bands into a single data stream, or to combine the two tap numbers from the FFT calculation with the original video data. In the preferred embodiment, the resulting data stream has data at 54 MHz with samples being alternately from the HP and LP taps of the bandsplit filter, and both still at the 27 MHz sampling rate.

Blocks 20 and 21 are line delays that delay the current video signal to form two additional lines of video for the A, B and C lines shown in FIG. 6. Blocks 22 and 24 are field delay memories to provide field delay and frame delay taps to the comb filter. Block 23 is a line delay, which with the field delay provides the interlaced line above and below the current line (lines D and E) for the comb filter. These signals are labeled in accordance with the video lines represented by the circles in FIG. 6. Block 17 represents an interframe motion detector. It is used to give priority to the frame comb signal in those cases where no motion is detected between lines B and F.

Figure 3:
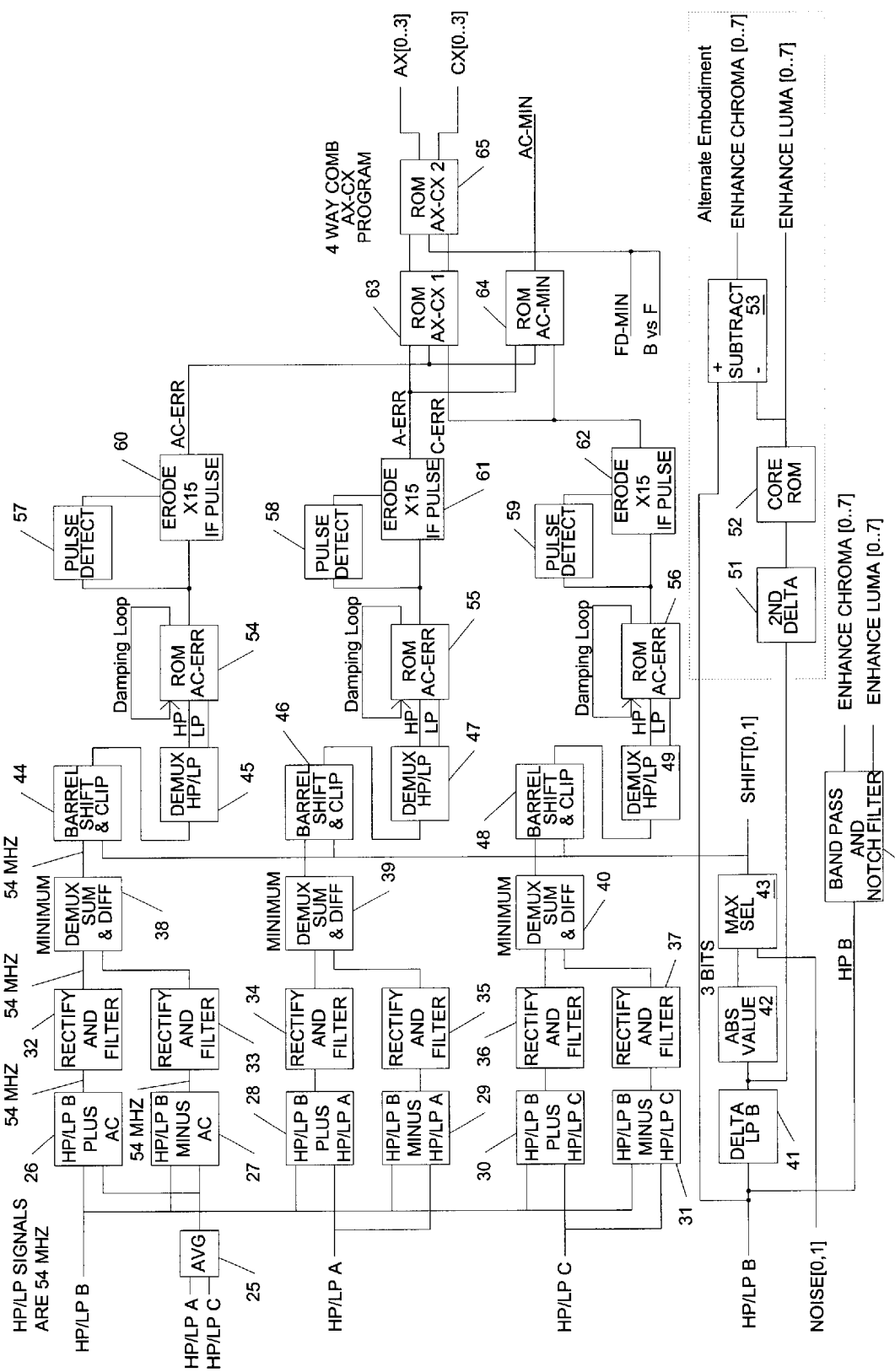
FIG. 3 illustrates the characterization(i.e., high pass (HP)/ low pass (LP)) processing for lines A, B, and C (as depicted in FIG. 6).
Figure 4:
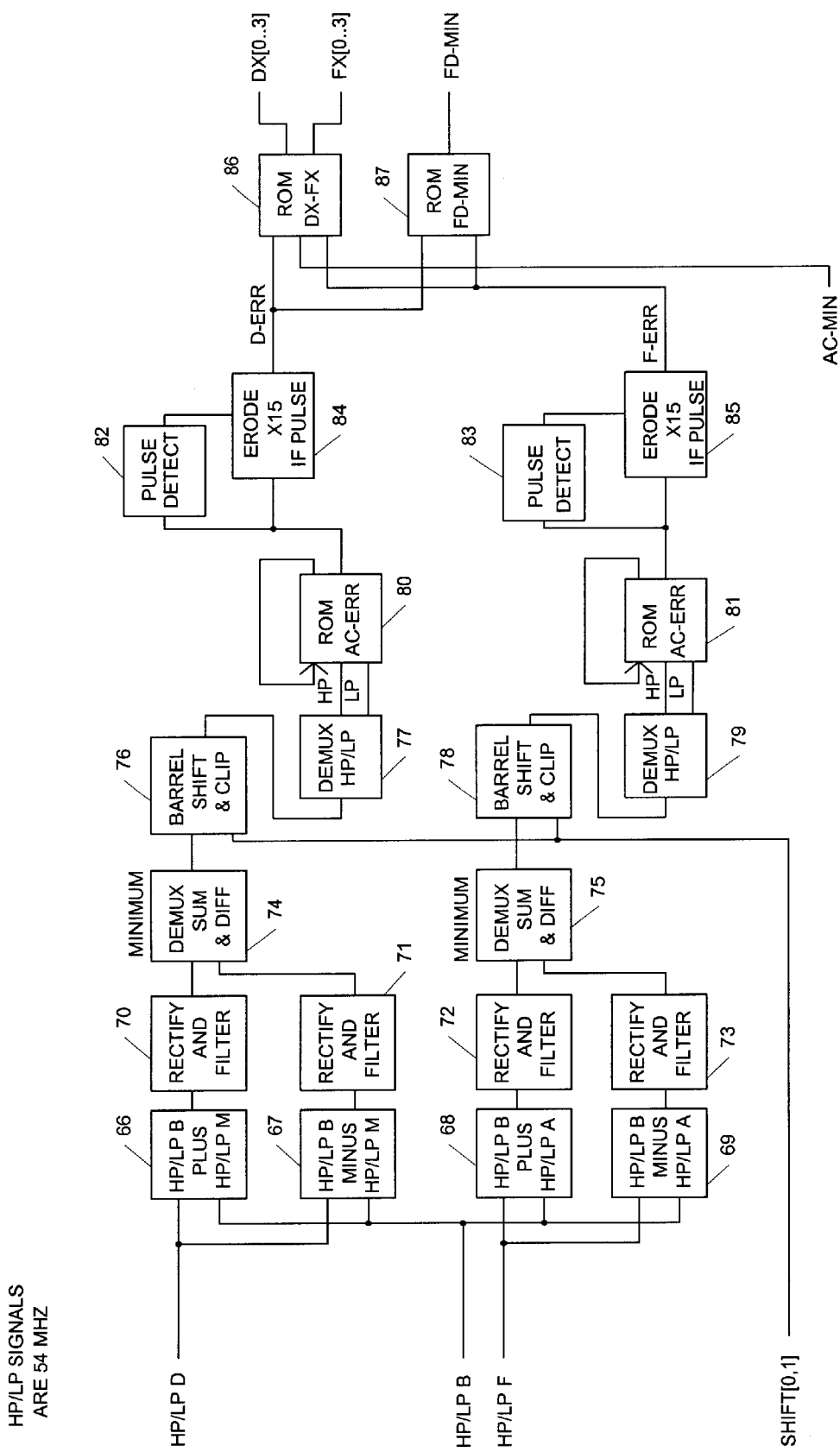
FIG. 4 illustrates the determination of the coefficients of the field and frame delay taps for lines D and F of the comb as depicted in FIG. 6.

The output signals from FIG. 2 feed the inputs of FIGS. 3 and 4. FIG. 3 is the line comparison processing for lines A, B and C. Comparison of the various band split taps (or FFT taps) is used to determine the similarity or differences between certain video lines. HP/LP A represents the advanced line, HP/LP B represents the current line and HP/LP C represents the delayed line. The purpose of the blocks in this block diagram is to develop the multiplier coefficients for the A and C lines for use in the adders of the comb filter. Block 25 averages the band split taps from the A and C lines. In other words, the average of LP A and LP C is compared to LP B to determine the level of similarity or difference to the current line. Blocks 26 through 37 perform sum and difference comparisons between the present line (line B) and the surrounding lines, and then rectify and filter the result to obtain error magnitude signals. Once these signals are generated, the error signal generated by sum comparisons is compared to the error signal generated by difference comparisons and the smaller of the two is allowed to propagate through the rest of the comb fail circuit.

In the preferred embodiment the output of the subtraction blocks is an eight bit number. The error ROM tables do not need eight bits of resolution to control a four bit multiplier coefficient in the comb multipliers. The barrel shift blocks (44–49) use the noise level inputs from FIG. 2 in conjunction with detection of edges in the low pass tap of the line B signal to determine the sensitivity of the three bit control signal sent to the AC-ERR (block 54), A-ERR (block 55) and C-ERR (block 56) ROM blocks. In the preferred embodiment the lower significant bit (LSB) input to the barrel shifters is ignored and the next three LSBs become the output when the noise level is 00. The barrel shift blocks also contain a clip function so that three bits can represent any error above their range by clipping to all 1s. Note that if the LSB is 0 and the MSB is 7 and an error occurs in bits 4,5,6 or 7, the three output bits will be clipped to 111. This is true of blocks 44 through 49. When the input noise level increases, the Noise [0,1] input for FIG. 2 increases from 00 to 01 to 10 and finally to 11 with a very noisy input. This signal, in conjunction with the detection of edges on line B, is used to make the FFT difference less sensitive with noisy inputs so the comb does not fail due to noise alone. The barrel shifter selects bits 2,3 and 4 with Noise code 01; bits 3,4 and 5 with Noise code 10 and bits 4,5 and 6 with Noise code 11. The clip function is moved up as the bit selection is moved up.

The line comparison techniques described above tend to generate occasional pulses or "glitches" which are not related to the actual video content of the signals. These are eliminated in a two step process. The first step of the process makes use of the fact that real video signals do not change suddenly. Blocks 54, 55, and 56 represent damping loops which inhibit sudden changes in the video.

Block 54 represents a ROM table that is programmed to consider the two inputs derived from the FFT subtractions in determining the error (AC-ERR) output. If the inputs are 000 and 000 the output will be 000. If the inputs are 111 on either input the output will be 111 after a transition time. The transition time is determined by the magnitude of the change and the 3 bit count feedback. A count up is started when a larger error is detected and a count down is started when a smaller error is detected. The full transition to a larger error on the output may occur in the first six clocks of the count up and the transition to a lower error may occur on the lower 6 counts of the count down. This produces a transition and hold effect. Block 55 is the A-ERR ROM that performs the same function for the B-A error and Block 56 is the C-ERR ROM for the B-C error.

The second step makes use of the fact that pulses below a certain width cannot represent real video due to bandwidth limits. In this step, pulses are detected by examining the error signal at three points in time and looking for the low-high-low signature of a pulse. When a pulse is detected, it is eliminated by passing only the minimum value of error across its width. Blocks 54 through 62 represent this process.

Block 63 is a ROM that is programmed to consider the inputs from blocks 60, 61 and 62 in determining the output control signals that represent the differences between the A, B and C lines. If all 3 lines are very similar the output would be 000 for the A output and 000 for the C output. If both A-ERR and C-ERR inputs are very different and the average AC-ERR is also different from B, the output would be 111 for both outputs. However if A-ERR and C-ERR are large but the average AC-ERR is small indicating the AC average is very similar to B, the output would be 000 and 000. If the A-ERR is large but the C-ERR is small the output would be 111 for A and 000 for B. Intermediate levels of difference are programmed for a sliding scale from 000 to 111 on each output independently.

Block 65 is programmed to use the A and C error signals from block 63, the B versus F input from block 17 in FIG. 2, and the FD-MIN input from FIG. 4, block 87. The AX and CX coefficient outputs are determined by all three inputs. If the FD-MIN is 000, 001 or 010 it indicates that the F and/or D line is similar to the B line and the sum of the D and F output coefficients (DX, FX) is as large as possible. Therefore, when FD-MIN is 000 through 010 the sum of AX and CX is 0100 which is 50% contribution from the AX+CX sum and from the FX+MX sum. The ratio of the AX and CX outputs is determined by the relative value of the A and C outputs from block 63. If the A signal from block 63 to block 65 is high indicating a large difference, and the B signal is low indicating a small error, the AX output would be 0000 and the B output would be 0100. However if the A signal and B signal are both high, meaning large errors on both signals, the AX coefficient would be 0000 and the CX coefficient would be 0000. This would mean the DX and FX coefficients would have to add to 1000 to comb 100%. The AC-MIN signal from block 64 carries the signal that indicates the degree of similarity of the A and/or C lines. When both the A and C errors are large the AC-MIN is large, the block 86 ROM receives that signal and compensates by increasing the DX and FX coefficients so that a sum of all four coefficients is kept at 1000 which is 100% even if all of that contribution has to come from one line.

The B versus F signal simply raises the sensitivity to error for lines A and C if there is no motion detected between lines B and F.

Figure 5:
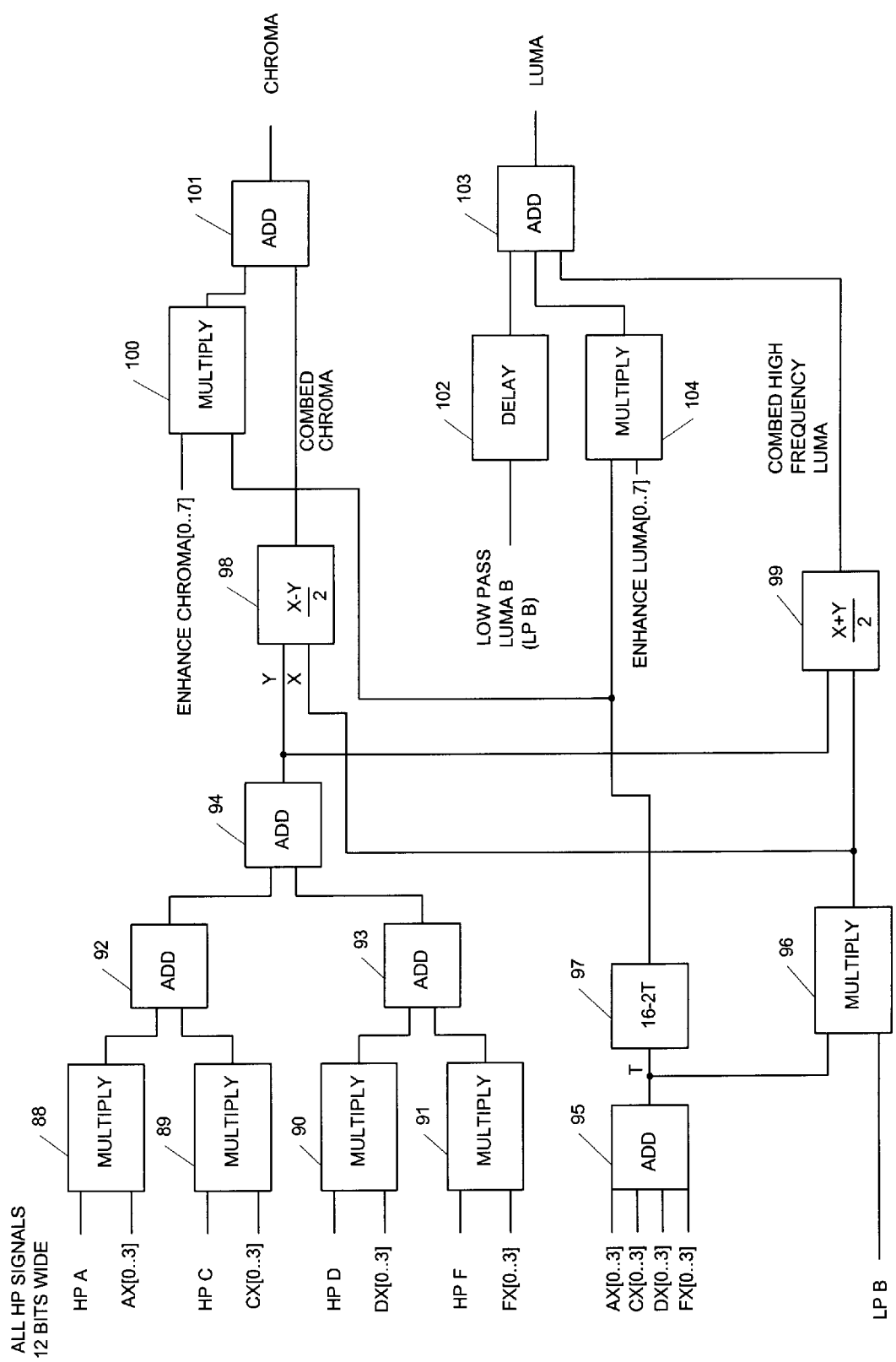
FIG. 5 illustrates the comb filter multipliers, adders, subtractors, and band pass filter that produces the chroma and luma outputs of the present invention.

Block 50 represents the band pass/notch filter mentioned above for use when there is a complete comb failure. Blocks 51, 52, and 53 represent an alternate method for enhancing the signal when there is a comb failure. In this alternative method, the second differential (i.e., discrete version of the second derivative) is calculated from the LP B signal and added back to the luma signal as shown in FIG. 5. This method produces results which are inferior to the preferred embodiment, but is available for a much lower resource cost.

FIG. 4 has been discussed already to some extent as to how it relates to FIG. 3. FIG. 4 determines the coefficients of the field and frame delay taps of the comb filter plus the value of the coefficients of the current line and in-phase line from the field delay. It is similar in function to FIG. 3 but does have several differences. Blocks 66 through 75 measure the error between lines D and B and between lines F and B as described above for blocks 26 through 40 in FIG. 3.

The barrel shift blocks b 76 through 79 are the same as blocks 44 through 49. Likewise blocks 80 and 81 are ROM tables that may be programmed the same as blocks 54, 55, and 56. Blocks 82 through 85 handle pulse detection and erosion in the same way that it is handled by blocks 54 through 62.

Block 86 determines the DX and FX coefficients similar to block 65 in the previous discussion. Block 87 determines the FD-MIN signal as discussed. These blocks have the same structure as blocks 65 and 64 in FIG. 3 but may have different programs depending on the weighting desired between line combing and field and frame combing. The relative weighting between line and field/frame combing may be predetermined in engineering or selected by an operator through a remote control interface. The local microprocessor may then calculate a new set of table values and load the ROM memories.

FIG. 5 contains the comb filter multipliers, adders, subtractors, and band pass filter that produces the chroma and luma outputs. Blocks 88 through 91 are multipliers that scale the high pass taps of the four surrounding lines (A, C, D and F) to the proper adaptive values. The multiplier coefficients are AX, CX, DX and FX. They are 4 bit binary values, however, the binary value 1000 creates 100% output for any particular line so no binary value will be created that is greater than 1000. Typically the weighting will add to 100% when any line or any combination of lines is similar to the B line. When all lines are similar to the B line the four coefficients will each be 0010. The outputs of multipliers 88 and 89 are added in block 92. Likewise the outputs of blocks 90 and 91 are added in block 93. The outputs of adder blocks 92 and 93 are added in block 94. A four way adder could be substituted for these 3 blocks. The output of block 94 is the sum of all the high pass taps of the out-of-phase surrounding lines.

The high pass tap of the current line is scaled by multiplier block 96 based on the sum of the AX, CX, DX, and FX coefficients. This insures that the gain of the current line matches the total gain of the surrounding lines, a necessary condition for a valid comb. Normally this multiplier is scaled to 100% which is 01000.

When two similar video lines contain random noise the signals are coherent but the noise is non-coherent. When the lines are added the signal is doubled but the noise is only increased by the square root of 2. Therefore the noise is reduced by 3 dB when the signal is divided by 2 to achieve unity gain. When four lines are averaged the noise is reduced by 6 dB and so on. There is a noise reduction of less than 6 dB when the 4 line average of the surrounding lines is subtracted from the current line B. However, if the B line were averaged with the in-phase line E the total noise reduction would exceed 6 dB for both the chroma and luma output signals. The noise is also reduced in the high frequency band in the luma output since the high pass data is noise reduced by combing before it is added to the current line. A wideband noise reduction can be achieved on the luminance output by adding the average of the out-of-phase lines from block 94 with the average of the B line and E line at the expense of some vertical smear and motion artifacts. A signal with high noise levels often looks better with reduced noise even though some of these artifacts are present.

In normal operation, the chroma signal is created at block 98 by subtracting the out-of-phase surrounding lines from the high pass tap of line B. The subtraction will cause the in-phase luma data to cancel and leave only the chroma data. Likewise, the high pass luma is created at block 99 by summing these same signals. A full bandwidth luma signal is then derived by summing the output of block 99 with a suitably delayed low pass luma tap from block 102, giving the result at block 103.

When there is a large difference on all four out-of-phase lines (A, C, D and F) the sum of the coefficients AX, CX, DX and FX will be 00000. This means the output of the adder block 94 will be 00000 and there is a total comb failure. Adaptive comb filters traditionally switch to a band split filter to separate luma and chroma signals when this happens. In this invention the effect of a band split filter is accomplished by progressively substituting the enhancement signals from FIG. 3 for combed signals coming from blocks 98 and 99. The details of this operation can be understood by noting that as the output of block 95 decreases from binary 1000 to binary 0000, the output of block 97 increases from 00000 to 10000 so that once the comb has completely failed, the entire chroma signal and the high pass luma signal are delivered through the enhancement channel instead of from the combing blocks 98 and 99.

The chroma output from block 90 is demodulated to its U and V component parts and scaled to meet CCIR-601 specifications in a somewhat conventional pair of quadrature demodulators.

Figure 7:
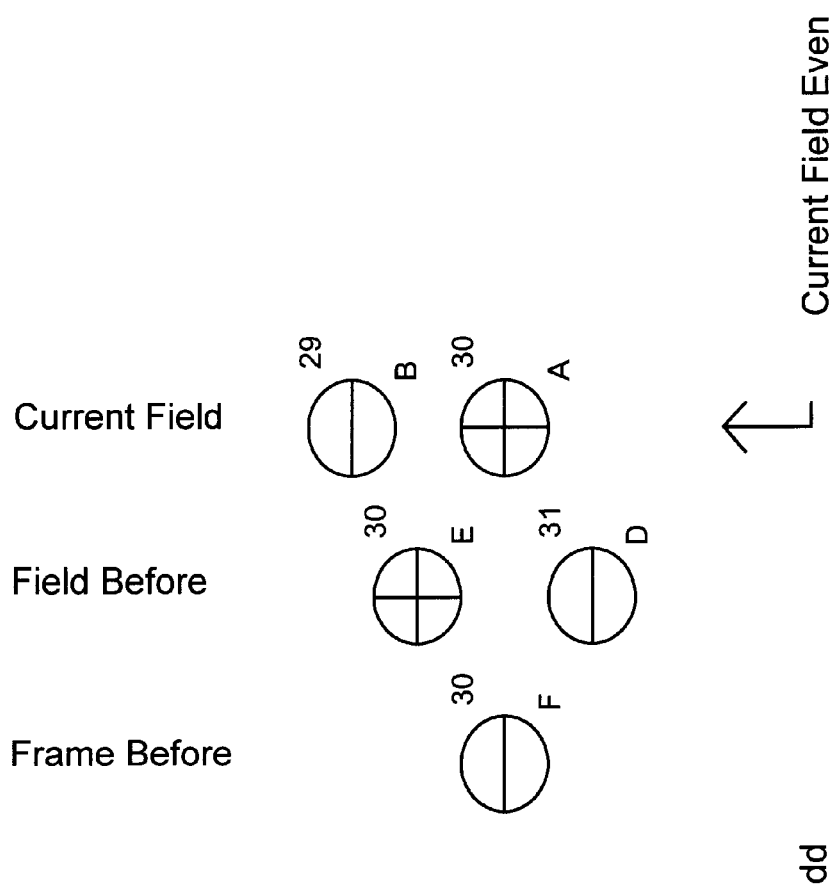
FIG. 7 is an illustration of a minimum delay mode comb filtering, which may be used as an alternate embodiment of the present invention.
Figure 7:
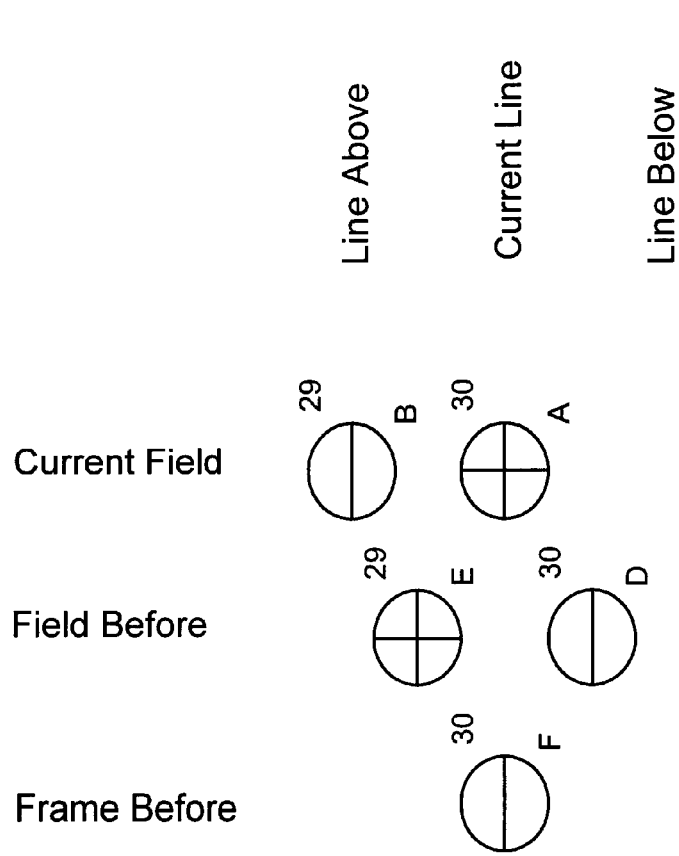
Figure 8:
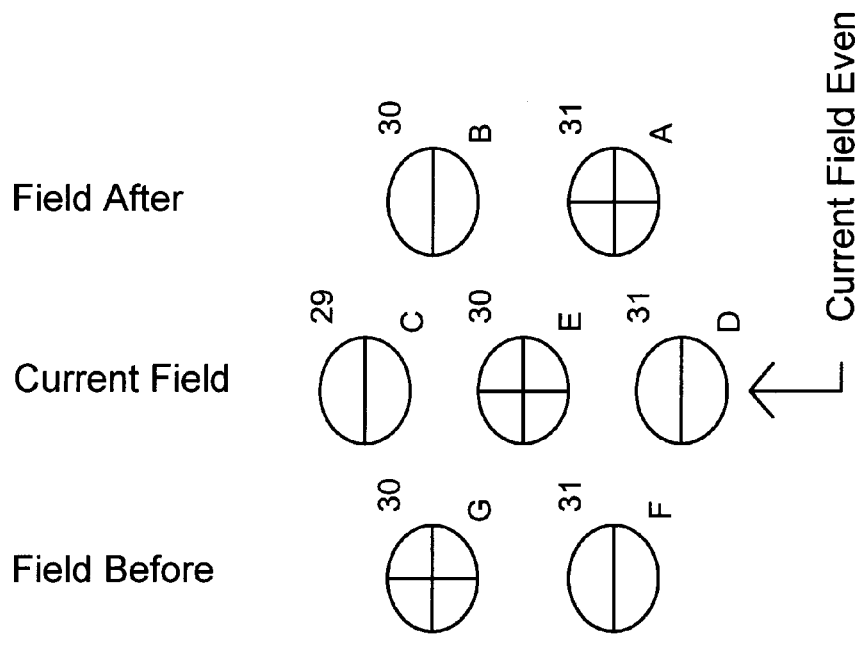
FIG. 8 is an illustration of symmetrical comb filtering, which may be used as an alternate embodiment of the present invention.
Figure 8:
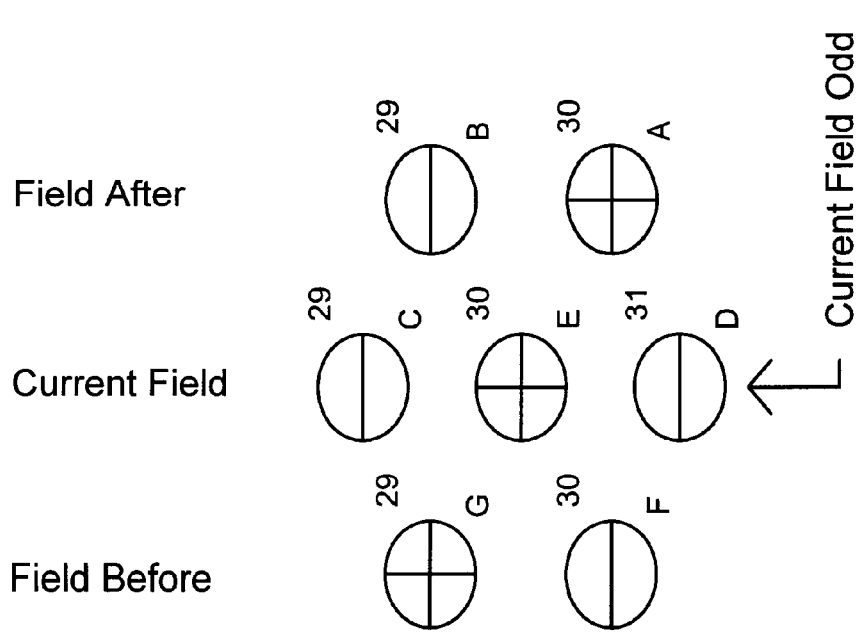
Figure 9:
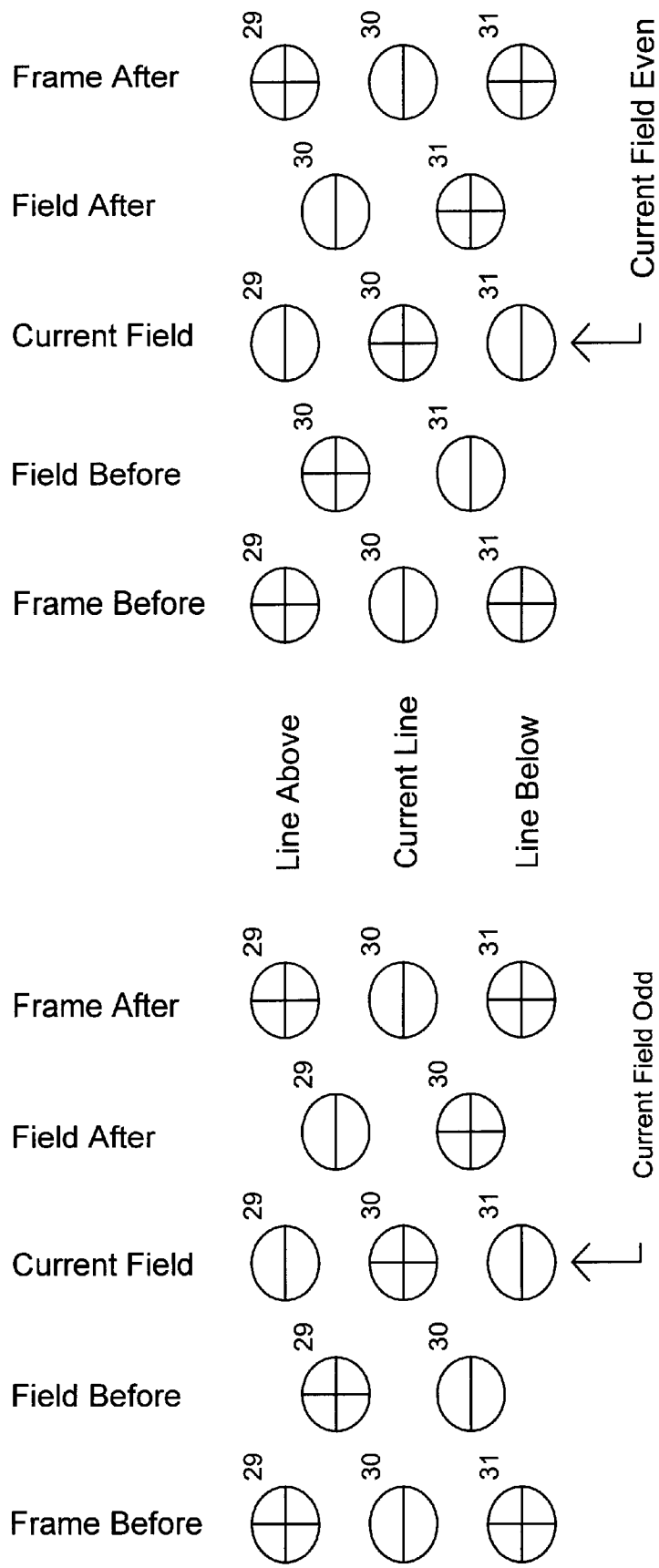
FIG. 9 illustrates the maximum use of field delays in the comb filtering concept of the present invention, which may be used as an alternate embodiment of the present invention.

The comb filter can be modified for several other modes of operation by changing the firmware load. For example, some television studios require a minimum delay of less than one horizontal line. This means the current line B cannot be delayed by one line. Therefore, the memory management is changed to make block 20 in FIG. 2 zero delay. That makes the A[0 . . . 11] equal to B[0 . . . 11] effectively eliminating the A line. This mode of operation is referred to as minimum delay mode and is shown in FIG. 7. FIG. 8 is an illustration of symmetrical comb filtering. The normal output is delayed by one field. The two interlaced lines of the advanced field and the two interlaced lines of the delayed field are used for comb filtering with a three line comb in the current field. This technique has the advantage of symmetrical motion artifacts and more noise reduction from averaging more taps. It requires one additional line memory and a slight rearrangement of the taps and the addition of another similarity signature decision chain and another multiplier. This mode of operation is allowed in the video decoder product. FIG. 9 is a maximum practical implementation in the use of field delays of the concept. FIG. 9 cannot be implemented in the present embodiment without adding several more field memories and line memories.

Those skilled in the art will appreciate that many modifications to the preferred embodiment of the present invention are possible while still obtaining the beneficial results of the present invention. It will also be apparent that some of the desired benefits of the present invention can be obtained by selecting some of the features of the present invention without using other features. Thus, the foregoing description is provided as illustrative of the principles of the present invention and not in limitation thereof, since the scope of the present invention is defined by the claims.

Additionally corresponding structures, materials, acts, and equivalents of any means plus function elements in the claims below are intended to include any structure, material, or acts for performing the functions in combination with any other claimed elements as specifically claimed.

While the invention has been particularly shown and described with reference to a preferred embodiment, it will be understood by those skilled in the art that various changes in form and detail may be made without departing from the spirit and scope of the present invention.

What is claimed is:

1. A digital comb filter for separating luma and chroma information from a composite video signal, comprising:

a band split filter circuit to generate a signature signal by which each line of video can be correlated, the signature signal having a low pass band that contains only luma, and a high pass band that contains both chroma and high frequency luma;

a multiplexer for combining samples alternately from a high pass tap and a low pass tap into a single data stream;

a plurality of line delays for delaying a current line of video to provide a plurality of line taps for the digital comb filter from a plurality of surrounding lines of video;

a plurality of field delay memories to provide a plurality of field delay and frame delay taps to the digital comb filter;

a line comparison circuit for comparing a plurality of band split taps to determine a similarity or a difference between the plurality of surrounding lines of video and the current line;

a field and frame comparison circuit for determining the coefficients of the field and frame delay taps of the digital comb filter and a value of the coefficients of the current video line and an in-phase line from the field delay; and a logic circuit for scaling and summing a plurality of high pass taps of the surrounding lines of video and generating chroma and high pass luma from the plurality of high pass taps of the surrounding lines of video and the current line of video.

2. The digital comb filter for separating luma and chroma of claim 1 wherein the logic circuit comprises:

a plurality of multiplier circuits for scaling the plurality of high pass taps of the surrounding lines of video;

a first adder circuit for generating a sum of the scaled high pass taps of the surrounding of lines of video;

a subtracter circuit for generating chroma by subtracting the sum of the scaled high pass taps of the surrounding lines of video from the high pass tap of the current line of video; and a second adder circuit for generating high pass luma by adding the high pass taps of the surrounding lines of video to the high pass tap of the current line of video.

3. The digital comb filter for separating luma and chroma of claim 1 further comprising a noise measurement circuit coupled to the band split filter circuit to allow the digital comb filter to adapt to noisy conditions on an input signal.

4. The digital comb filter for separating luma and chroma of claim 1 further comprising an interframe motion detector for giving priority to a frame comb signal when no motion is detected between the current line and a frame delayed line.

5. The digital comb filter for separating luma and chroma of claim 1 further comprising an adder circuit for combining a delayed low pass luma tap with a combed high frequency luma tap to generate a full bandwidth luma signal.

6. The digital comb filter for separating luma and chroma of claim 1 wherein the line comparison circuit comprises:
a plurality of logic circuits for performing a plurality of sum and difference comparisons between the current line of video and each of the surrounding lines; and
a plurality of circuits for rectifying and filtering each of a plurality of results of the sum and difference comparisons to generate corresponding error magnitude signals.

7. The digital comb filter for separating luma and chroma of claim 6 wherein the line comparison circuit further comprises:
a plurality of demultiplexer sum and difference circuits for comparing an error signal generated by the sum comparison to an error generated by the difference comparison and selecting the smaller of the two error signals to propagate through a comb fail circuit;
a plurality of barrel shifters coupled to the demultiplexer sum and difference circuit and a noise measurement circuit to control the sensitivity of a three-bit control signal sent to a plurality of error output signal read only memories.

8. The digital comb filter for separating luma and chroma of claim 7 wherein each barrel shifter further comprises a clip function that enables the three-bit signal to represent any error above the range of the barrel shifter by clipping the three bits to 111.

9. The digital comb filter for separating luma and chroma of claim 8 further comprising a plurality of damping loops to inhibit sudden changes in a video input.

10. The digital comb filter for separating luma and chroma of claim 9 further comprising a plurality of pulse detect circuits that examines the error signal at three points in time to find a low-high-low signature of a pulse, and passes a minimum value of error across the width of the pulse.

11. The digital comb filter for separating luma and chroma of claim 10 wherein the field and frame comparison circuit comprises:
a plurality of logic circuits for performing sum and difference comparisons between the current line of video and each of the plurality of surrounding lines; and
a plurality of circuits for rectifying and filtering each of the plurality of results of the sum and difference comparisons to generate corresponding error magnitude signals.

12. The digital comb filter for separating luma and chroma of claim 11 wherein the field and frame comparison circuit further comprises:
a plurality of demultiplexer sum and difference circuits for comparing the error signal generated by the sum comparison to the error generated by the difference comparison and selecting the smaller of the two error signals to propagate through a comb fail circuit;
a plurality of barrel shifters coupled to the demultiplexer sum and difference circuit and the noise measurement circuit to control the sensitivity of a three-bit control signal sent to a plurality of error output signal read only memories.

13. The digital comb filter for separating luma and chroma of claim 12 wherein each barrel shifter further comprises a clip function that enables the three-bit signal to represent any error above the range of the barrel shifter by clipping the three bits to 111.

14. The digital comb filter for separating luma and chroma of claim 13 further comprising a plurality of pulse detect circuits that examine the error signal at three points in time to find a low-high-low signature of a pulse, and passes a minimum value of error across the width of the pulse.

15. The digital comb filter for separating luma and chroma of claim 14 wherein the outputs from the line comparison circuit and the field and frame comparison circuit are a plurality of coefficients that are continuously variable and which provide a weighted average of all of the lines of the digital comb filter for use in the logic circuit for generating chroma and high pass luma.

16. The digital comb filter for separating luma and chroma of claim 1 further comprising a band pass notch filter for enhancing a digital video output if the digital comb filter fails.

17. The digital comb filter for separating luma and chroma of claim 16 further comprising a logic circuit for calculating a second derivative of a low pass filtered version of a video signal to enhance luma and chroma in the event of a comb failure.

18. The digital comb filter for separating luma and chroma of claim 1 wherein the digital comb filter provides a minimum delay comb filtering by combing a current line of video with an advanced line, a delayed line in a current field, an out-of-phase line in a delayed field, an in-phase line in a delayed field, and a frame delayed signal in the same vertical position as the current line of video.

19. The digital comb filter for separating luma and chroma of claim 1 wherein the digital comb filter provides a studio minimum delay comb filtering by combing a current line of video with a delayed line in a current field, an out-of-phase line in a delayed field, an in-phase line in a delayed field, and a frame delayed signal in the same vertical position as the current line of video.

20. The digital comb filter for separating luma and chroma of claim 1 wherein the digital comb filter provides a symmetric comb filtering by combing a current line of video with two interlaced lines of an advanced field with two interlaced lines of a delayed field.

21. A digital comb filter for separating luma and chroma information from a composite video signal, comprising:
a Fast Fourier Transform (FFT) circuit using a fifteen point FFT to generate a signature signal by which each line of video can be correlated, the signature signal having a low pass band that contains only luma, and a high pass band that contains both chroma and high frequency luma;
a multiplexer for combining samples alternately from a high pass tap and a low pass tap into a single data stream;
a plurality of line delays for delaying a current line of video to provide a plurality of line taps for the digital comb filter from a plurality of surrounding lines of video;
a plurality of field delay memories to provide a plurality of field delay and frame delay taps to the digital comb filter;
a line comparison circuit for comparing a plurality of band split taps to determine a similarity or a difference between the plurality of surrounding lines of video and the current line;
a field and frame comparison circuit for determining the coefficients of the field and frame delay taps of the digital comb filter and a value of the coefficients of the current video line and an in-phase line from the field delay; and a logic circuit for scaling and summing a plurality of high pass taps of the surrounding lines of video and generating chroma and high pass luma from the plurality of high pass taps of the surrounding lines of video and the current line of video.

22. The digital comb filter for separating luma and chroma of claim 21 wherein FFT values are limited to two points of the FFT, a first value near a subcarrier frequency and a second value between the subcarrier frequency and DC.

23. The digital comb filter for separating luma and chroma of claim 21 wherein the logic circuit comprises:

a plurality of multiplier circuits for scaling the plurality of high pass taps of the surrounding lines of video;

a first adder circuit for generating a sum of the scaled high pass taps of the surrounding of lines of video;

a subtracter circuit for generating chroma by subtracting the sum of the scaled high pass taps of the surrounding lines of video from the high pass tap of the current line of video; and a second adder circuit for generating high pass luma by adding the high pass taps of the surrounding lines of video to the high pass tap of the current line of video.

24. The digital comb filter for separating luma and chroma of claim 21 further comprising a noise measurement circuit coupled to the FFT circuit to allow the digital comb filter to adapt to noisy conditions on an input signal.

25. The digital comb filter for separating luma and chroma of claim 21 further comprising an interframe motion detector for giving priority to a frame comb signal when no motion is detected between the current line and a frame delayed line.

26. The digital comb filter for separating luma and chroma of claim 21 further comprising an adder circuit for combining a delayed low pass luma tap with a combed high frequency luma tap to generate a full bandwidth luma signal.

27. The digital comb filter for separating luma and chroma of claim 21 wherein the line comparison circuit comprises:

a plurality of logic circuits for performing a plurality of sum and difference comparisons between the current line of video and each of the surrounding lines; and a plurality of circuits for rectifying and filtering each of a plurality of results of the sum and difference comparisons to generate corresponding error magnitude signals.

28. The digital comb filter for separating luma and chroma of claim 27 wherein the line comparison circuit further comprises:

a plurality of demultiplexer sum and difference circuits for comparing an error signal generated by the sum comparison to an error generated by the difference comparison and selecting the smaller of the two error signals to propagate through a comb fail circuit;

a plurality of barrel shifters coupled to the demultiplexer sum and difference circuit and a noise measurement circuit to control the sensitivity of a three-bit control signal sent to a plurality of error output signal read only memories.

29. The digital comb filter for separating luma and chroma of claim 28 further comprising a plurality of damping loops to inhibit sudden changes in a video input.

30. The digital comb filter for separating luma and chroma of claim 29 further comprising a plurality of pulse detect circuits that examines the error signal at three points in time to find a low-high-low signature of a pulse, and passes a minimum value of error across the width of the pulse.

31. The digital comb filter for separating luma and chroma of claim 30 wherein the field and frame comparison circuit comprises:

a plurality of logic circuits for performing sum and difference comparisons between the current line of video and each of the plurality of surrounding lines; and a plurality of circuits for rectifying and filtering each of the plurality of results of the sum and difference comparisons to generate corresponding error magnitude signals.

32. The digital comb filter for separating luma and chroma of claim 31 wherein the field and frame comparison circuit further comprises:

a plurality of demultiplexer sum and difference circuits for comparing the error signal generated by the sum comparison to the error generated by the difference comparison and selecting the smaller of the two error signals to propagate through a comb fail circuit;

a plurality of barrel shifters coupled to the demultiplexer sum and difference circuit and the noise measurement circuit to control the sensitivity of a three-bit control signal sent to a plurality of error output signal read only memories.

33. The digital comb filter for separating luma and chroma of claim 32 further comprising a plurality of pulse detect circuits that examine the error signal at three points in time to find a low-high-low signature of a pulse, and passes a minimum value of error across the width of the pulse.

34. The digital comb filter for separating luma and chroma of claim 33 wherein the outputs from the line comparison circuit and the field and frame comparison circuit are a plurality of coefficients that are continuously variable and which provide a weighted average of all of the lines of the digital comb filter for use in the logic circuit for generating chroma and high pass luma.

35. A method for separating luma and chroma information from a composite video signal, comprising:

generating a signature signal by which each line of video can be correlated, the signature signal having a low pass band that contains only luma, and a high pass band that contains both chroma and high frequency luma;

multiplexing samples alternately from a high pass tap and a low pass tap into a single data stream;

delaying the current line of video by a plurality of line delays to provide a plurality of line taps for a digital comb filter from a plurality of surrounding lines of video;

providing a plurality of field delay and frame delay taps to the digital comb filter by a plurality of field delay memories;

comparing a plurality of band split taps in a line comparison circuit to determine a similarity or a difference between the plurality of surrounding lines of video and the current line;

determining the coefficients of the field and frame delay taps of the digital comb filter and a value of the coefficients of the current video line and an in-phase line from the field delay by a field and frame comparison circuit; and scaling and summing a plurality of high pass taps of the surrounding lines of video by a logic circuit and generating chroma and high pass luma from the plurality of high pass taps of the surrounding lines of video and the current line of video.

36. The method for separating luma and chroma of claim 35 further comprising:

scaling the plurality of high pass taps of the surrounding lines of video by a plurality of multiplier circuits;

generating a sum of the scaled high pass taps of the surrounding of lines of video in a first adder circuit;

generating chroma by subtracting the sum of the scaled high pass taps of the surrounding lines of video from the high pass tap of the current line of video in a subtracter circuit; and generating high pass luma by adding the high pass taps of the surrounding lines of video to the high pass tap of the current line of video in a second adder circuit.

37. The method for separating luma and chroma of claim 35 further measuring noise to allow the digital comb filter to adapt to noisy conditions on an input signal.

38. The method for separating luma and chroma of claim 35 further comprising detecting interframe motion and giving priority to a frame comb signal when no motion is detected between the current line and a frame delayed line.

39. The method for separating luma and chroma of claim 35 further comprising combining a delayed low pass luma tap with a combed high frequency luma tap to generate a full bandwidth luma signal.

40. The method for separating luma and chroma of claim 35 wherein the comparison step comprises:

performing a plurality of sum and difference comparisons between the current line of video and each of the surrounding lines; and rectifying and filtering each of a plurality of results of the sum and difference comparisons to generate corresponding error magnitude signals.

41. The method for separating luma and chroma of claim 40 wherein the comparison step further comprises:

comparing an error signal generated by the sum comparison to an error generated by the difference comparison and selecting the smaller of the two error signals to propagate through a comb fail circuit;

controlling the sensitivity of a three-bit control signal sent to a plurality of error output signal read only memories by a plurality of barrel shifters.

42. The method for separating luma and chroma of claim 41 further comprises clipping any error above the range of the barrel shifter by clipping the three bits to 111.

43. The method for separating luma and chroma of claim 41 further comprising inhibiting sudden changes in a video input by a plurality of damping loops.

44. The method for separating luma and chroma of claim 43 further comprising examining the error signal at three points in time to find a low-high-low signature of a pulse, and passing a minimum value of error across the width of the pulse.

45. The method for separating luma and chroma of claim 44 further comprising calculating a second derivative of a low pass filtered version of a video signal to enhance luma and chroma in the event of a comb failure.

46. The method for separating luma and chroma of claim 43 wherein the determining step comprises:

performing sum and difference comparisons between the current line of video and each of the plurality of surrounding lines; and rectifying and filtering each of a plurality of results of the sum and difference comparisons to generate corresponding error magnitude signals.

47. The method for separating luma and chroma of claim 46 wherein the determining step further comprises:

comparing the error signal generated by the sum comparison to the error generated by the difference comparison and selecting the smaller of the two error signals to propagate through a comb fail circuit;

controlling the sensitivity of a three-bit control signal sent to a plurality of error output signal read only memories.

48. The method for separating luma and chroma of claim 47 further comprising examining the error signal at three points in time to find a low-high-low signature of a pulse, and passing a minimum value of error across the width of the pulse.

49. The method for separating luma and chroma of claim 46 wherein each barrel shifter further comprises clipping any error above the range of the barrel shifter by clipping the three bits to 111.

50. The method for separating luma and chroma of claim 48 wherein the plurality of coefficients are continuously variable and provide a weighted average of all of the lines of the digital comb filter for use in the logic circuit for generating chroma and high pass luma.

51. The method for separating luma and chroma of claim 35 further comprising providing a minimum delay comb filtering by combing a current line of video with an advanced line, a delayed line in a current field, an out-of-phase line in a delayed field, an in-phase line in a delayed field, and a frame delayed signal in the same vertical position as the current line of video.

52. The method for separating luma and chroma of claim 35 further comprising providing a studio minimum delay comb filtering by combing a current line of video with a delayed line in a current field, an out-of-phase line in a delayed field, an in-phase line in a delayed field, and a frame delayed signal in the same vertical position as the current line of video.

53. The digital comb filter for separating luma and chroma of claim 35 further comprising providing a symmetric comb filtering by combing a current line of video with two interlaced lines of an advanced field with two interlaced lines of a delayed field.

* * * * *